United States Patent Office 3,147,375
Patented Sept. 1, 1964

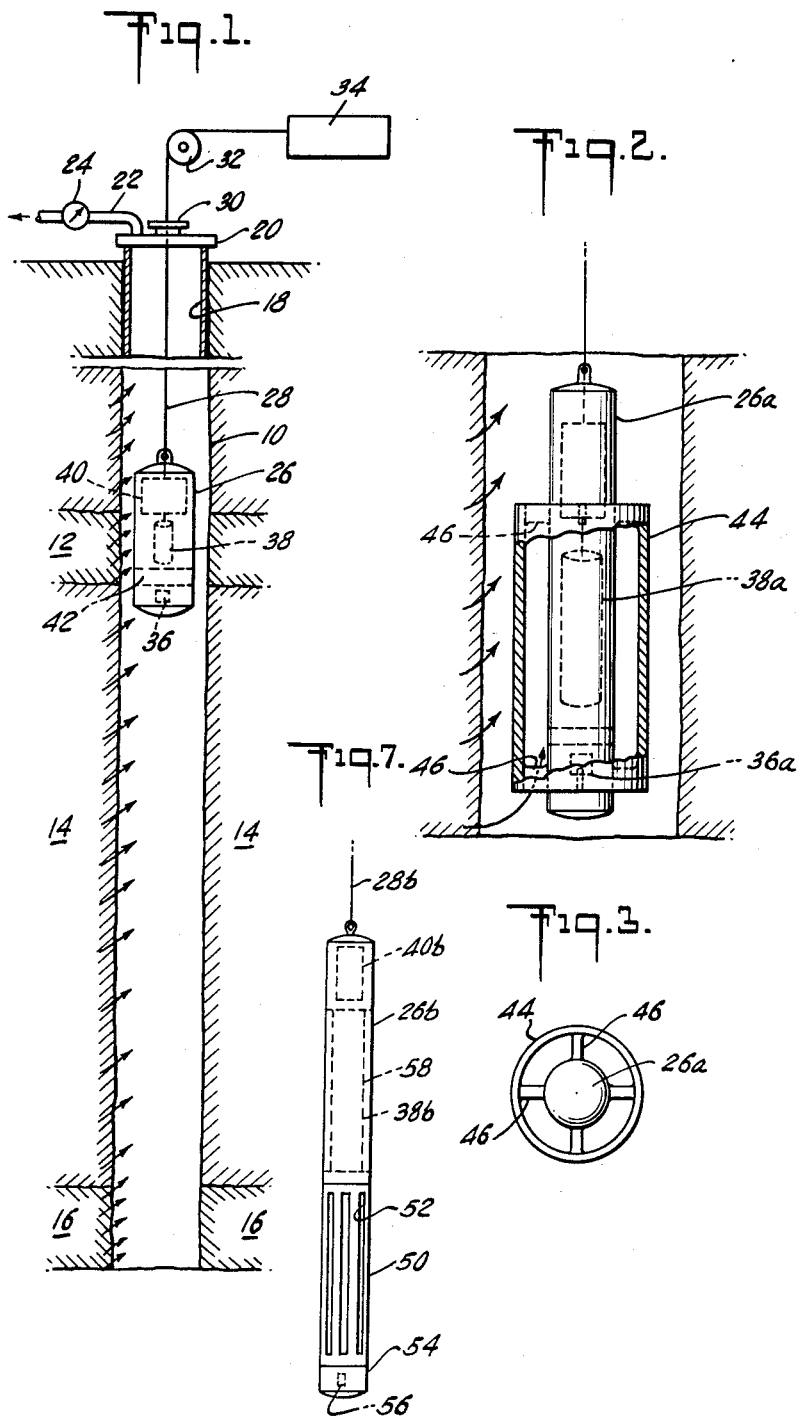

3,147,375
PRODUCTIVITY WELL LOGGING
Edmond F. Egan, Dallas, Tex., assignor to Texaco Inc., a corporation of Delaware
Original application Nov. 14, 1955, Ser. No. 546,352, now Patent No. 2,961,539. Divided and this application Apr. 21, 1959, Ser. No. 807,891
20 Claims. (Cl. 250—43.5)

This invention relates to oil-well production and more particularly to a method and an apparatus by means of which a measurement or determination can be made as to the exact location of zones or formations from which a fluid or a plurality of fluids such as gas, oil and water are entering a well bore hole. A measurement of this kind is sometimes known as a productivity log of the bore hole or a section thereof.

This application is a division of application Serial No. 546,352, filed November 14, 1955, now Patent No. 2,961,539, in the names of Edmond F. Egan, Gerhard Herzog and Joseph C. Allen.

In oil-well production it is, of course, desirable if not frequently essential to know the depth and vertical thickness of a formation from which a fluid such as gas, oil or water is entering the hole. In many instances two of these fluids or all three may be flowing into the well at the same time each from a different zone or formation and it is desirable to ascertain the location of all of these formations. Again it is frequently necessary to know the amount of one, two or all of the fluids flowing into the well together with the locations of the zones from which they are flowing. A record showing this information is often called a productivity log of the well and the information obtained therefrom is useful in many ways. For example, it may be desired to seal off the gas and water producing formations from a formation or zone producing oil and this may be done by the proper use of sealing or plugging agents, packers and the like providing the location of the producing zone is known.

Since gas, oil and water have different densities, a density stratification will exist wherever one of such fluids flow into such a well bore. In accordance with this invention these density stratifications are ascertained and located by passing through the well bore, or that section thereof which is of interest, an instrument responsive to the different densities of the fluids while correlating therewith the depth of the instrument in the hole. The amount of gas, oil or water flowing into the hole can, of course, be measured at the well head by suitable metering means and by measuring the amount of the fluids in this manner and knowing the location and thickness of the formation from which the fluids are entering the hole an accurate productivity log of the hole will be obtained.

In carrying out the invention a logging instrument is passed through the portion of the well to be logged while suspended from a conductor cable extending upwardly from the instrument to suitable amplifying and recording means at the surface. The instrument includes a source of penetrative radiation such as gamma rays and a detector of gamma rays. The output signals from the detector are passed upwardly to the surface through the cable and recorded preferably on a moving tape or film strip. As the instrument moves through the bore hole gamma rays from the source will be scattered in the well fluid and the detector will indicate the scattered gamma ray intensity which will be indicative of the density of the fluid surrounding the instrument at any one time, since, as is well known, gamma rays passing outwardly from the source into surrounding material will be absorbed more or less in the surrounding material and this absorption will vary with the density of said material. Thus, when the instrument moves through a well containing well fluid and is opposite a zone from which gas is flowing into the well there will be considerably less gamma ray absorption in the fluid than will be the case when the instrument is opposite a water producing formation.

For a better understanding of the invention reference may be had to the accompanying drawing in which:

FIG. 1 is a vertical sectional view through a portion of the well bore hole showing a density measuring instrument suspended therein;

FIG. 2 is a vertical elevation partly in section showing a modified form of the measuring instrument;

FIG. 3 is a bottom plan view of the instrument shown in FIG. 2;

FIG. 7 is a vertical elevation of another modified form of measuring instrument.

Figure 4:
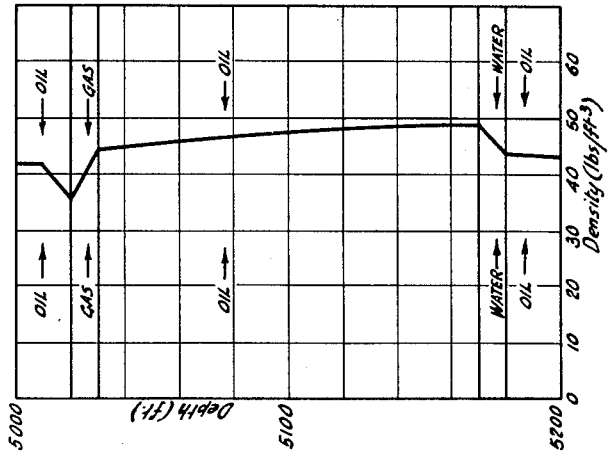
FIGS. 4, 5 and 6 are curves of a 200-foot section of a well in which three arrangements of invasion points are arbitrarily chosen with illustrations of the resultant densities as a function of depth in the bore hole.

Referring to the drawing and particularly to FIG. 1 thereof, a well bore hole 10 is shown as penetrating three different formations 12, 14 and 16 from which formations it is assumed that gas, oil and water respectively are passing into or invading the hole. The upper end of the well is shown as cased at 18 with a casing head 20 from which extends an outflow pipe 22 containing a suitable flow meter 24. Shown suspended within the bore hole is an instrument indicated generally by an elongated housing 26, the instrument being suspended from a conductor cable 28 extending through a suitable packing gland 30 and over a cable measuring drum or reel 32 which serves to indicate or measure the amount of cable payed out and thereby the depth of the instrument 26 in the bore hole. The upper end of the cable is connected to a suitable amplifying and recording device 34.

Within the instrument housing 26 and preferably near the lower end thereof is a source of penetrative radiation 36, preferably one which emits soft gamma rays such as caesium 137. At a fixed distance from the source 36, preferably about 12 inches, is a gamma ray detector 38 connected to a suitable preamplifier 40 the output of which is, in turn, connected to the lower end of the conductor cable 28. Disposed between the source 36 and the detector 38 is a layer or block 42 of gamma ray absorptive material preferably formed of a high atomic number metal such as lead or tantalum, this material serving to shield the detector 38 from gamma rays which would otherwise pass directly upwards from the source to the detector.

Assuming that the instrument 26 has been lowered into the well bore and is surrounded by the well fluid, gamma rays from the source 36 will pass outwardly into the surrounding fluid wherein they will be scattered, some of them passing back toward the center of the hole so as to strike the detector 38. As stated above, more or less of the gamma rays will be absorbed in the surrounding well fluid, the amount of absorption depending upon the density of the fluid. The output of the detector 38 as recorded at 34 will therefore be an indication of a measurement of the density of the well fluid then surrounding the instrument 26.

Assuming that gas is entering the bore hole from the formation 12, the gas-liquid mixture which will surround the instrument when opposite that formation will be relatively light and since there will be comparatively little absorption of the gamma rays in the fluid, the detector will indicate a relatively high intensity. As the instrument is lowered further into or opposite the zone 14, from which it is assumed oil is entering the hole, the detector will indicate a lower intensity of detected scattered gamma rays and then when the detector is lowered so as to be opposite the formation 16, from which it is assumed water is entering the hole, the detector will indicate a still lower intensity of gamma rays. The operator observing the record of the detector output will know when the instrument is passing from any one of these zones to an adjacent zone and knowing the depth of the instrument in the hole as indicated at 32 he will be able to locate accurately the position or depth of each zone and its upper and lower boundaries. If, then, the amount of gas flowing from the well is measured at 24 and likewise the amounts of oil and water by the same or similar flow measuring devices, these measurements, when correlated with the measurements of radiation intensity and the depth of the instrument in the hole will constitute a productivity log of at least that section of the bore hole through which the instrument has passed.

In FIG. 2 a somewhat modified form of the logging instrument is illustrated. Actually the instrument 26a is substantially the same as the instrument 26 but at least that portion of the instrument containing the detector 38a and the source 36a is surrounded by a shield member 44 preferably in the form of a cylinder of lead or some other high atomic number metal. The shield member 44 is substantially open at its upper and lower ends and is disposed concentrically and spaced from the instrument housing 26a by suitable web supports 46, as shown more clearly in FIG. 3.

Some of the gamma rays from the source 36a may of course penetrate into the surrounding solid earth formation to be scattered therein and return to strike the detector 38a. The shield member 44 is of such a thickness that substantially all of these gamma rays scattered from the solid formation back toward the detector will be absorbed in the shield and the gamma rays which are detected will be only those which are scattered within the well fluid in the annular space between the instrument housing 26a and the cylindrical shield 44. With such a device a somewhat more accurate measurement of the density of the fluid will be obtained.

In the instruments shown in FIGS. 1 and 2 the measurement is made of gamma rays scattered in the well fluid outside of, i.e., surrounding the logging instrument and as stated in the above paragraph the shield 44 shown in FIG. 2 can be used to intercept any gamma rays scattered back into the well from the earth formations so that they will not strike the detector to give spurious indications. Another form of the measuring instrument which has been found to be very effective is illustrated in FIG. 7. This instrument comprises a housing 26b suspended from the cable 28b and containing a gamma ray detector 38b and associated preamplifier 40b. Depending from the lower end of the housing 26b is a semi-open section 50 comprising a cylinder containing a plurality of longitudinal slots 52 through its wall and extending substantially throughout its length. To the lower end of the extension 50 is attached a source holder 54 containing a source of radiation 56 such as caseium 137.

In the form of measuring instrument illustrated in FIG. 7 there is no shield corresponding to the shield 42 of FIG. 1 between the source and the detector but rather the extension cylinder 50 is open to the well fluid which will pass through the slots 52 and thus occupy space directly between the source 56 and the detector 38b. The radiation from the source will pass longitudinally upwardly through the interior of the extension 50 and thus through the well fluid present at any particular depth of the instrument in the bore hole. This radiation will strike the lower end of the detector 38b and the intensity of the radiation striking the detector will, of course, depend upon the density of the well fluid within the slotted section. In order to shield the detector 38b from radiation which may be scattered back to the detector from the earth formations, the detector is preferably surrounded by a layer 58 of a high atomic number metal such as lead or tantalum, this layer performing substantially the same function as the cylindrical shield 44 of the instrument illustrated in FIG. 2.

Figure 5:
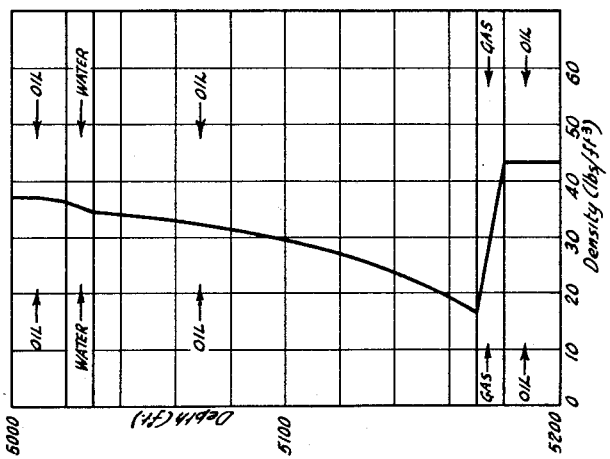
Figure 6:
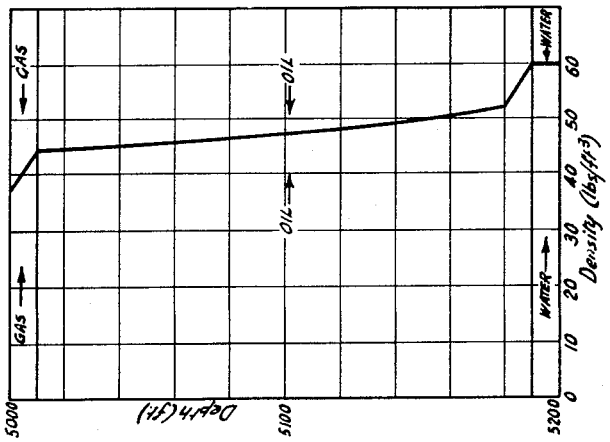

In FIGS. 4, 5 and 6 are shown three curves, each representing a hypothetical set of conditions which might occur in a bore hole. In each curve the gas, oil and water invasion points or zones are arbitrarily chosen and the resultant densities as a function of depth in the well bore are indicated by the curves. Each curve represents a 200-foot pay zone, i.e., producing formation, as indicated by the depth from 5,000 to 5,200 feet. It may be assumed that this particular well is in a field being produced by water drive augmented by gas injection. In other words, water augmented by gas is pumped into one or more wells in the field and this water or gas serves to force the oil toward the producing well or wells. The reservoir conditions in this field include pressure of approximately 2,500 p.s.i. and temperature of 215+° F. The solution gas-oil ratio is 900 cu. ft. per bbl. The following flow conditions may be assumed:

10,000 bbls. per day oil production
1,000 bbls. per day water production
Producing gas-oil ratio of 12,000 cu. ft. per bbl.

It may be assumed further that the excess gas being produced in the well is gas from an injection well (although the origin of the gas is, of course, not important) and is entering the producing well bore from a 10 foot permeable zone (such as the zone 12 of FIG. 1) and that the water production is also invading the well bore from a 10 foot permeable zone such as the zone 16 illustrated in FIG. 1. At reservoir conditions these flow densities prevail

| | Lbs. per cu. ft. |
|---|---|
| Gas | 5.6 |
| Oil | 43.5 |
| Water | 60 |

It is also assumed that complete mixing occurs in the well in a 10 foot interval. Quantities of excess gas and water production are measured at the surface and various flow rates could be employed for a complete analysis. For purposes of illustration many situations other than those represented in FIGS. 4, 5 and 6 are, of course, possible but it is felt that these three represent typical density contrasts that would exist at various depth intervals.

In FIG. 4, the gas is shown as entering the well from the zone between 5,000 and 5,010 feet while the water enters between 5,190 and 5,200 feet. The oil production is between the depths of 5,010 and 5,190. The log of such a well would, of course, indicate the density of the water at 60 lbs. per cu. ft. and directly above the upper water boundary the density of the oil-water mixture would taper down rapidly and then more gradually up to the lower boundary of the gas zone. Above that boundary the density would again decrease rapidly due to the mixture of the inflowing gas with the water and oil.

In FIG. 5, it is assumed that oil is entering the well from 5,000 to 5,020 feet, water from 5,020 to 5,030 feet, oil from 5,030 to 5,170 feet, gas from 5,170 to 5,180 feet and oil again below the last mentioned depth. With such conditions the density curve would be as indicated in this figure.

In FIG. 6, still another set of conditions is represented and the density curve shown would result in a situation where oil enters the well from 5,000 to 5,020 feet, gas from 5,020 to 5,030 feet, oil from 5,030 to 5,170 feet, water from 5,170 to 5,180 feet and oil below the 5,180 foot depth.

It is understood that instruments such as shown in FIGS. 1, 2 and 7 can be lowered or raised continuously through the well or that portion of the well to be logged or that the instruments can be moved by increments throughout the section and maintained at each point for a time sufficient to obtain a sufficiently accurate density measurement. As stated hereinabove, this type of record would establish the location of the zone or zones of entry of oil, water and gas and these measurements correlated with measurements of the quantity of the three fluids flowing from the well would comprise an accurate productivity log or record.

Obviously many modifications and variations of the invention, as hereinabove set forth, may be made without departing from the spirit and scope thereof, and therefore only such limitations should be imposed as are indicated in the appended claims.

I claim:

1. An apparatus for use in locating the zones from which fluids of different densities are entering a well which comprises an instrument housing, a conductor cable from which said housing is suspended in the well, means for measuring the depth of the housing in the well, a source of penetrative radiation in said housing, a detector of said radiation in said housing and disposed a predetermined distance from said source, shielding means for absorbing radiation which would otherwise pass directly from the source to the detector, and means for shielding said detector from radiation from said source scattered within the solid formations surrounding said well, said last named means comprising a substantially cylindrical shield member of penetrative radiation absorptive material concentrically surrounding and separated radially from that portion of the housing containing said source and said detector.

2. An apparatus for use in locating the zones from which fluids of different densities are entering a well which comprises an instrument housing, a conductor cable from which said housing is suspended in the well, means for measuring the depth of the housing in the well, a source of penetrative radiation in said housing, a detector of said radiation in said housing and disposed a predetermined distance from said source, shielding means for absorbing radiation which would otherwise pass directly from the source to the detector, and a second shielding member surrounding at least that portion of said housing containing said source and said detector, said second shielding member being spaced radially from said housing and being substantially open at its upper and lower ends and composed of a material adapted to absorb that radiation penetrating and being scattered within the formations traversed by the well and which scattered radiation might otherwise strike said detector, the arrangement being such that as the instrument moves through the well a portion of the well fluid present at the particular depth of the instrument in the well will occupy the space between the instrument housing and said second shielding member, the intensity of the radiation from said source scattered within said portion of the well fluid and striking said detector being indicative of the density of said portion of well fluid.

3. An apparatus as described in claim 2 in which the second shielding member is a cylinder of a metal of high atomic number.

4. An apparatus for use in locating the zones from which fluids of different densities are entering a well which comprises an instrument housing, a conductor cable from which said housing is suspended in the well, means for measuring the depth of the housing in the well, a source of penetrative radiation in said housing and a detector of said radiation in said housing and disposed a predetermined distance from said source, a portion of the housing intermediate the source and detector providing a chamber open to the well fluid contained within the well so that when the instrument is at any particular depth in the well a portion of the well fluid at that depth will occupy said chamber, and be exposed to the radiation emitted by said source, said detector being exposed to radiation resulting in said chamber and significantly influenced by said fluid in said chamber, the intensity of the radiation from the source reaching the detector therefore being dependent upon the density of the fluid then in said chamber.

5. Apparatus for use in locating the zones from which fluids of different densities are entering a well which comprises an exploring unit having a passageway through which well fluids may pass, a gamma ray source disposed to pass rays through said passageway, a gamma ray detector disposed to receive the rays passing through the passageway so as to measure the density of the fluid therein and means for shielding said detector from radiations emanating from the formations surrounding the well, means for moving said unit through the well and means for measuring the depth of the unit in the well.

6. Apparatus for logging a bore hole through earth formations for deriving a signal proportional to the density of well fluid at various locations in the bore hole which comprises a logging instrument adapted to be passed through the bore hole including a source of penetrative gamma radiation for irradiating well fluid in said bore hole at various locations throughout the bore hole, a gamma ray detector, exposed to gamma radiation resulting from said irradiation of the well fluid in the bore hole, and means for shielding the detector from stray radiation resulting from said source which is influenced by the adjacent earth formations in the vicinity of the irradiated well fluid.

7. Apparatus for logging a bore hole through earth formations for locating fluids having different density than other fluid in the bore hole which comprises a logging instrument adapted to be passed through the bore hole including a source of penetrative gamma radiation, a gamma ray detector spaced a predetermined distance from said source, said instrument including access means whereby well fluid will pass between the source and detector at various locations in the bore hole, means for shielding the detector from stray radiation which would otherwise reach the detector as a result of scattering of gamma radiation from said source and which stray radiation is influenced by the adjacent earth formations in the vicinity of the instrument, and means for providing a log of the intensity of the gamma radiation impinging upon said detector at various locations in the bore hole.

8. A method for determining the location of respective areas of entry of different fluids into a well bore, each of said fluids having a significantly different effect upon a beam of penetrative radiation, which comprises emitting a beam of penetrative radiation at different locations along the well bore and logging, at a fixed distance from the source of said beam of penetrative radiation, the variations at each location in that parameter of said beam of penetrative radiation which has passed through and been affected only by the well fluids occurring in the well bore at said location.

9. Apparatus for use in locating zones containing fluids of different density in a bore hole which comprises an instrument housing, means for passing said housing through the bore hole, means for measuring the depth of the housing in the bore hole, a source of soft gamma rays of predetermined intensity mounted to said housing, a gamma ray detector mounted to said housing at a predetermined distance from said source, said source being positioned with respect to said detector so that gamma rays may pass directly through a sample of the bore hole fluid enroute to said detector, and means for providing a signal display indicating the intensity of the gamma radiation reaching the detector through said sample of the bore hole fluid from the source in correlation with the location of the instrument housing in the bore hole.

10. Apparatus for use in locating zones containing fluids of different density in a bore hole which comprises an instrument housing, means for passing said housing through the bore hole, means for measuring the depth of the housing in the bore hole, a source of soft gamma rays of predetermined intensity mounted to said housing, a gamma ray detector mounted to said housing at a predetermined distance from said source, said source being positioned with respect to said detector so that gamma rays may pass directly through a sample of the bore hole fluid enroute to said detector, means for maintaining said housing spaced a predetermined minimum distance from the sides of the bore hole, and means for providing a signal display indicating the intensity of the gamma radiation reaching the detector through said sample of the bore hole fluid from the source in correlation with the location of the instrument housing in the bore hole.

11. Apparatus according to claim 10 wherein said means for maintaining said housing spaced a predetermined distance from the sides of the bore hole comprises a tubular shield of high atomic number metal surrounding at least a portion of said instrument housing and spaced a predetermined distance therefrom.

12. Apparatus for use in locating zones containing fluids of different density in a bore hole which comprises an instrument housing, means for passing said housing through the bore hole, means for measuring the depth of the housing in the bore hole, a source of soft gamma rays of predetermined intensity mounted to said housing, a gamma ray detector mounted to said housing at a predetermined distance from said source, said source being positioned with respect to said detector so that gamma rays may pass through a region including a portion of the fluid in the bore hole enroute to said detector, means for maintaining said housing spaced a predetermined minimum distance from the sides of the bore hole, and means for providing a signal display indicating the intensity of the gamma radiation reaching the detector through said portion of the fluid in the bore hole from the source in correlation with the location of the instrument housing in the bore hole.

13. Apparatus according to claim 12 wherein said means for maintaining said housing spaced a predetermined distance from the sides of the bore hole comprises a tubular shield of high atomic number metal surrounding at least a portion of said instrument housing and spaced a predetermined distance therefrom.

14. An apparatus for use in locating the zones from which fluids of different densities are entering a well which comprises an instrument housing, a conductor cable from which said housing is suspended in the well, means for measuring the depth of the housing in the well, a source of penetrative radiation in said housing and a detector of said radiation in said housing and disposed a predetermined distance from said source, a portion of the housing intermediate the source and detector providing a chamber open to the well fluid so that when the instrument is at any particular depth in the well a portion of the well fluid at that depth will occupy said chamber, said chambered housing portion being provided with apertures throughout its length, the intensity of the radiation from the source reaching the detector therefore being dependent upon the density of the fluid then in said chamber.

15. An apparatus as described in claim 14 in which said apertures are formed as vertically disposed slots.

16. An apparatus for use in locating the zones from which fluids of different densities are entering a well which comprises an instrument housing, a conductor cable from which said housing is suspended in the well, means for measuring the depth of the housing in the well, a source of penetrative radiation in said housing and a detector of said radiation in said housing and disposed a predetermined distance from said source, said detector being surrounded at its vertical sides with a layer of radiation absorptive material, a portion of the housing intermediate the source and detector providing a chamber open to the well fluid so that when the instrument is at any particular depth in the well a portion of the well fluid at that depth will occupy said chamber, the intensity of the radiation from the source reaching the detector therefore being dependent upon the density of the fluid then in said chamber.

17. Apparatus for use in locating zones containing fluids of different density in a bore hole which comprises an instrument housing, means for passing said housing through the bore hole, means for measuring the depth of the housing in the bore hole, a source of gamma rays of predetermined intensity mounted to said housing, a gamma ray detector mounted to said housing at a predetermined distance from said source, said source being positioned with respect to said detector so that gamma rays may pass directly through a sample of the bore hole fluid occurring in the well bore enroute to said detector, and means for providing a signal display indicating the intensity of the gamma radiation reaching the detector through said sample of the bore hole fluid from the source in correlation with the location of the instrument housing in the bore hole.

18. The method defined in claim 8 further characterized in that said step of emitting a beam of penetrative radiation consists essentially of emitting a beam of gamma radiation.

19. The method defined in claim 8 further characterized in that said step of emitting a beam of penetrative radiation consists essentially of emitting a beam of soft gamma radiation.

20. Apparatus as defined in claim 9 wherein said source of soft gamma rays is caesium 137.

References Cited in the file of this patent

UNITED STATES PATENTS

| | | |
|---|---|---|
| 2,335,409 | Hare | Nov. 30, 1943 |
| 2,926,259 | Dewan | Feb. 23, 1960 |
| 2,943,197 | Witte | June 28, 1960 |